J. W. BARWICK.
AUTOMOBILE LOCK.
APPLICATION FILED JAN. 15, 1920.
1,378,757.
Patented May 17, 1921.
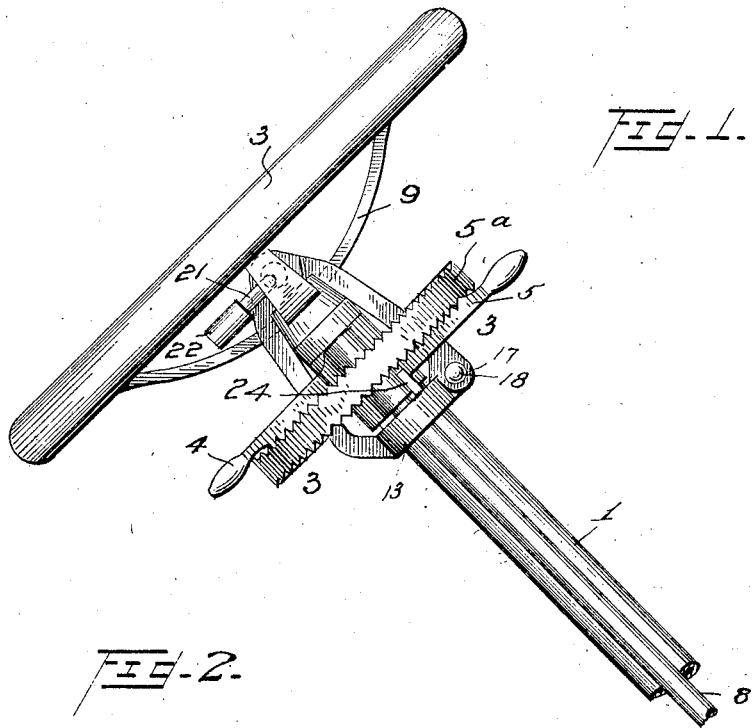
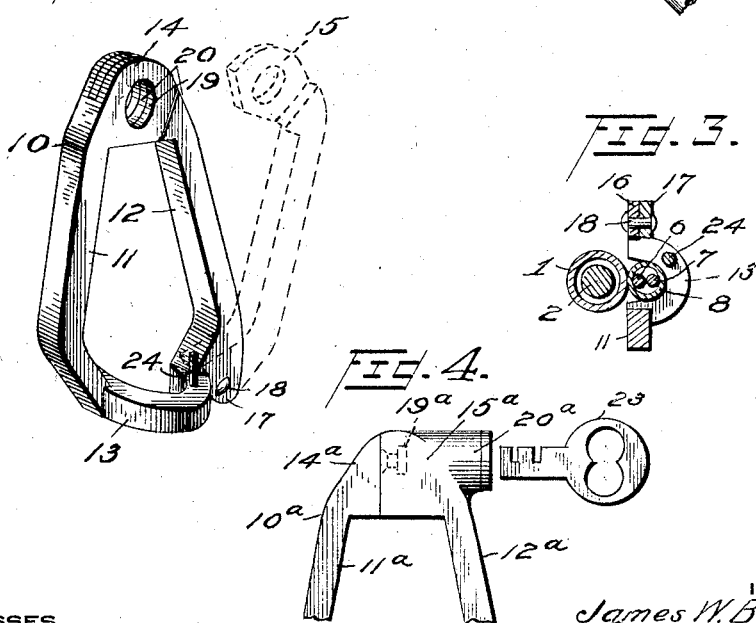
WITNESSES
E. C. Duffy
F. F. Chapman.
INVENTOR
James W. Barwick
BY
C. G. Siggers
ATTORNEY

UNITED STATES PATENT OFFICE.

JAMES W. BARWICK, OF PINEPARK, GEORGIA.

AUTOMOBILE-LOCK.

1,378,757. Specification of Letters Patent. Patented May 17, 1921.

Application filed January 15, 1920. Serial No. 351,735.

*To all whom it may concern:*

Be it known that I, JAMES W. BARWICK, a citizen of the United States, residing at Pinepark, in the county of Grady and State of Georgia, have invented a new and useful Automobile-Lock, of which the following is a specification.

This invention has reference to automobile locks, and its object is to provide a readily attachable and detachable lock capable of locking the steering wheel and the fuel and spark levers so as to ordinarily prevent the starting of the engine, or, if the engine be started, to prevent the steering of the vehicle.

In accordance with the invention, there is provided a loop structure formed of two parts hinged or pivoted together in such manner that the parts may be separated or approached to permit the application of the lock to the steering wheel end of the steering post to embrace a spoke of the steering wheel spider and lie close against the fuel and spark control levers with the latter held in substantially inactive position and so related as to be there locked either by a padlock or a key-controlled or other lock of substantially nonpickable type. The lock loop has a side bend to partially embrace a housing on one side of the steering post casing and employed to protect the control shafts, so that the legs of the lock loop may lie in close relation to the steering post, thus permitting the lock when in place to have but little play. The lock is of a character permitting it to be applied to the steering wheel or control lever quadrant for carrying purposes when not in use for locking the wheel, so that the lock is always present when needed.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claim.

In the drawings,

Figure 1 is an elevation of the steering wheel and adjacent parts of a known make of automobile, showing the lock in locking position.

Fig. 2 is a perspective view of the lock of Fig. 1 shown removed from the steering wheel with one leg of the lock in dotted lines in the open position.

Fig. 3 is a section on the line 3—3 of Fig. 1.

Fig. 4 is an elevation of the separable end of the lock of Fig. 1 in somewhat modified form.

Referring first to the structure shown in the drawing is indicated the steering post casing 1, the steering post shaft 2, and the steering wheel 3 of a type of automobile known commercially as the Dodge automobile. Located at a suitable distance below the steering wheel 3 are engine control levers 4, 5 movable over a toothed quadrant $5^a$. These levers are attached to respective engine control shafts 6, 7 extending through another casing 8 alongside of the steering post casing 1. As is customary in various makes of automobiles, the steering wheel 3 is provided with a spider 9 by which the rim of the wheel is made fast to the steering shaft 2.

For a steering wheel structure of the type shown in Fig. 1, there is provided a lock loop 10 shown separately in Fig. 2. This loop comprises two legs or side bars 11, 12 diverging toward one end of the lock, the leg 11 having at one end a side bend 13 and at the other end formed into a pair of spaced ears 14. The leg 12 is formed with an ear 15 adapted to enter between the ears 14. That end of the side bend 13 remote from the leg 11 is provided with an eye 16, and the leg 12 at the end remote from the ear 15 is provided with an eye 17 matching the eye 16 and pivotally connected thereto by a suitably headed pin 18, the arrangement being such that the leg 12 is hinged to the leg 11 through the side bend 13, so that the ear 15 may be moved into position to enter between the ears 14. The perforations 19, 20 in the ears 14, 15 are thus brought into matching relation and are then adapted to receive the shackle 21 of a padlock 22 shown in Fig. 1. Of course, other locking devices may be employed in place of the padlock 22, and the invention is therefore not confined to such particular instrumentality for holding the legs 11 and 12 together. For instance, in Fig. 4 a lock loop $10^a$ is provided with legs $11^a$, $12^a$ having respective heads 14ᵃ, 15ᵃ, the head 14ᵃ having a lock element 19ᵃ and the head 15ᵃ being provided with a matching lock element 20ᵃ adapted to receive the lock element 19ᵃ, so that the two legs 11ᵃ and 12ᵃ may be secured together by causing the lock element 19ᵃ to enter the lock element 15ᵃ. By making the lock element 15ᵃ of the key type, and particularly of the tumbler type, it may be controlled by a suitable key 23 which may be made capable of resisting picking. Instead of employing locks of the types shown in Figs. 1 and 4, other types of locks may be used.

On the side bend 13 there is located a pin 24 so positioned that when the lock loop 10 is in place so that the side bend 13 is about the casing 8 with the legs 11 and 12 in the path of the engine control levers 4 and 5, the pin 24 will stand in the way of the lever 5 in such manner that the lever is held in a position inactive for any useful purpose, wherefore the engine cannot be started, or can only be run with very poor efficiency. At the same time, the lock loop 10 is so positioned as to embrace one of the arms of the spider 9 with the lock loop so related to the engine control levers 4 and 5 and the pin 24 that neither the levers 4 and 5 nor the steering wheel 3 can be manipulated to any useful extent. So long as the lock loop 10 remains in place in locking position, the automobile is effectively locked against any attempt to drive the automobile.

The locking device of the invention is susceptible of manufacture of hardened material of file-proof character so that when the parts of the automobile are locked together, the lock loop can neither be severed by a file or a hack-saw nor cut by pliers.

What is claimed is:—

An automobile steering post lock comprising a lock loop formed of two legs diverging from one end toward the other, the ends of the legs constituting the narrower end of the loop having intermeshing eyes for the reception of the shackle of a padlock and the legs being hinged together at the other ends with one of the legs there provided with a side bend bridging the space between the legs at the wide end of the loop, and that end of the side bend where the other leg is hinged to it being provided with a pin directed toward the smaller end of the loop.

In testimony, that I claim the foregoing as my own, I have hereto affixed my signature.

JAMES W. BARWICK.